(12) United States Patent
Sitaram et al.

(10) Patent No.: US 9,913,190 B1
(45) Date of Patent: Mar. 6, 2018

(54) TRANSFERRING A WIRELESS DEVICE FROM A SERVING CELL TO A TARGET CELL

(71) Applicant: Sprint Spectrum LP, Overland Park, KS (US)

(72) Inventors: Krishna Sitaram, Chantilly, VA (US); Chunmei Liu, Great Falls, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 127 days.

(21) Appl. No.: 14/805,779

(22) Filed: Jul. 22, 2015

(51) Int. Cl.
H04W 36/24 (2009.01)
H04B 7/0413 (2017.01)
H04W 36/00 (2009.01)

(52) U.S. Cl.
CPC .......... H04W 36/24 (2013.01); H04B 7/0413 (2013.01); H04W 36/00 (2013.01)

(58) Field of Classification Search
CPC ..... H04W 36/22; H04W 36/18; H04W 36/24; H04W 36/14; H04W 36/26; H04W 36/165; H04W 36/245; H04W 36/0083; H04W 36/08; H04W 36/30; H04W 36/00; H04W 36/36; H04W 36/02; H04B 7/0413; H04B 7/0491; H04B 7/04
USPC .......................................................... 370/331
See application file for complete search history.

(56) References Cited

U.S. PATENT DOCUMENTS

| | | | |
|---|---|---|---|
| 8,565,154 B2 | 10/2013 | Ji et al. | |
| 2009/0088160 A1 | 4/2009 | Pani et al. | |
| 2010/0298001 A1* | 11/2010 | Dimou | H04W 64/006 455/441 |
| 2011/0096815 A1* | 4/2011 | Shin | H04B 7/0689 375/219 |
| 2012/0231739 A1* | 9/2012 | Chen | H04B 7/026 455/41.2 |
| 2012/0252464 A1* | 10/2012 | Borst | H04W 36/22 455/443 |
| 2013/0143578 A1* | 6/2013 | Lekutai | H04W 36/0083 455/444 |
| 2014/0036874 A1 | 2/2014 | Jeong et al. | |
| 2014/0194121 A1* | 7/2014 | Lindoff | H04W 36/24 455/436 |
| 2014/0328327 A1 | 11/2014 | Xiao et al. | |
| 2015/0036663 A1* | 2/2015 | Kilpatrick, II | H04W 36/0083 370/332 |
| 2015/0065133 A1* | 3/2015 | Cui | H04W 36/22 455/436 |
| 2015/0146595 A1* | 5/2015 | Jamadagni | H04W 52/0229 370/311 |
| 2016/0366628 A1* | 12/2016 | Sarkar | H04W 28/0284 |

FOREIGN PATENT DOCUMENTS

CN 102325353 B * 3/2014

* cited by examiner

*Primary Examiner* — Michael Thier
*Assistant Examiner* — Rownak Islam (57) ABSTRACT

One or more factors are determined for a target cell, the one or more factors being at least one of a morphology, a band class, a loading, and a MIMO type. A modified target cell signal strength threshold for the target cell is set using the one or more factors. The modified target cell signal strength threshold is utilized to initiate a transfer of the wireless device from the serving cell to the target cell.

21 Claims, 6 Drawing Sheets

| Scenarios | | μ | β | ε | $\emptyset_T$ | $\emptyset_S$ | Modified threshold | Result |
|---|---|---|---|---|---|---|---|---|
| First Scenario Dense urban environment with wireless device switching from low to high priority cell having lower loading and higher MIMO scheme | Target Cell | 0.5 | 0.1 | 0.2 | 0.3 | 0.6 | -115 dBm | By changing threshold to lower value, devices will transition to higher priority band faster |
| Second Scenario Rural environment with wireless device moving from high priority cell to low priority cell having lower loading and similar MIMO scheme | Serving Cell | 0.8 | 0.4 | 0.2 | 0.4 | 0.7 | -102 dBm | By changing threshold for changing bands to a lower value and target to a higher value, devices will take longer time to transition to lower priority band |
| | Serving Cell | 0.8 | 0.7 | 0.4 | 0.4 | 0.7 | -91 dBm | |

| MIMO | ε |
|------|-----|
| 2T2R | 0.4 |
| 2T4R | 0.3 |
| 4T4R | 0.2 |
| 8T8R | 0.1 |

| Morphology | μ |
|------------|-----|
| Dense Urban | 0.5 |
| Urban | 0.6 |
| Sub-urban | 0.7 |
| Rural | 0.8 |

| Band | β |
|------|-----|
| 800 MHz | 0.7 |
| 1.9 GHz | 0.4 |
| 2.5 GHz | 0.1 |

| Scenarios | | μ | β | ε | $\emptyset_T$ | $\emptyset_S$ | Modified threshold | Result |
|---|---|---|---|---|---|---|---|---|
| First Scenario Dense urban environment with wireless device switching from low to high priority cell having lower loading and higher MIMO scheme | Target Cell | 0.5 | 0.1 | 0.2 | 0.3 | 0.6 | -115 dBm | By changing threshold to lower value, devices will transition to higher priority band faster |
| | Serving Cell | 0.8 | 0.4 | 0.2 | 0.4 | 0.7 | -102 dBm | By changing threshold for changing bands to a lower value and target to a higher value, devices will take longer time to transition to lower priority band |
| Second Scenario Rural environment with wireless device moving from high priority cell to low priority cell having lower loading and similar MIMO scheme | Serving Cell | 0.8 | 0.7 | 0.4 | 0.4 | 0.7 | -91 dBm | |

TRANSFERRING A WIRELESS DEVICE FROM A SERVING CELL TO A TARGET CELL

TECHNICAL BACKGROUND

Telecommunication systems, such as cellular networks or other wireless networks, may provide a plurality of cells that a wireless device may use to communicate with a network. The various cells may provide different capabilities for communication with the network, such as varying speeds for data transmission. Methods that transfer wireless devices from a serving cell to a target cell may be able to provide a high quality service to users of the system, if the transfer is from a low priority system to a high priority system. Similarly, preventing a transfer from a high priority system to a low priority system will prevent a reduction in the quality of the service provided to the users. Providing the high quality service to users of the system may depend on how low priority systems and high priority systems are distinguished.

OVERVIEW

In an embodiment, one or more factors are determined for a target cell, the one or more factors being at least one of a morphology, a band class, a loading, and a MIMO type. A modified target cell signal strength threshold for the target cell is set using the one or more factors. The modified target cell signal strength threshold is utilized to initiate a transfer of the wireless device from the serving cell to the target cell. In an embodiment, the modified target cell signal strength threshold is utilized by comparing the modified target cell signal strength threshold to a signal strength of a reference signal that is provided by the target cell.

DETAILED DESCRIPTION

The various exemplary embodiments described herein contemplate methods for transferring a wireless device from a serving cell to a target cell. The methods take into consideration factors that reflect the priority of a cell. For example, factors for a target cell may indicate that the target cell is a high priority cell. The factors for the target cell may be used to set a modified target cell threshold such that the transfer to the high priority cell will be more likely to occur when compared to the unmodified target cell threshold. When the serving cell is a high priority cell, the factors of the serving cell may be used to set a serving cell threshold so that a transfer from the serving cell to a low priority cell is less likely to occur when compared to an unmodified serving cell threshold.

Figure 1:
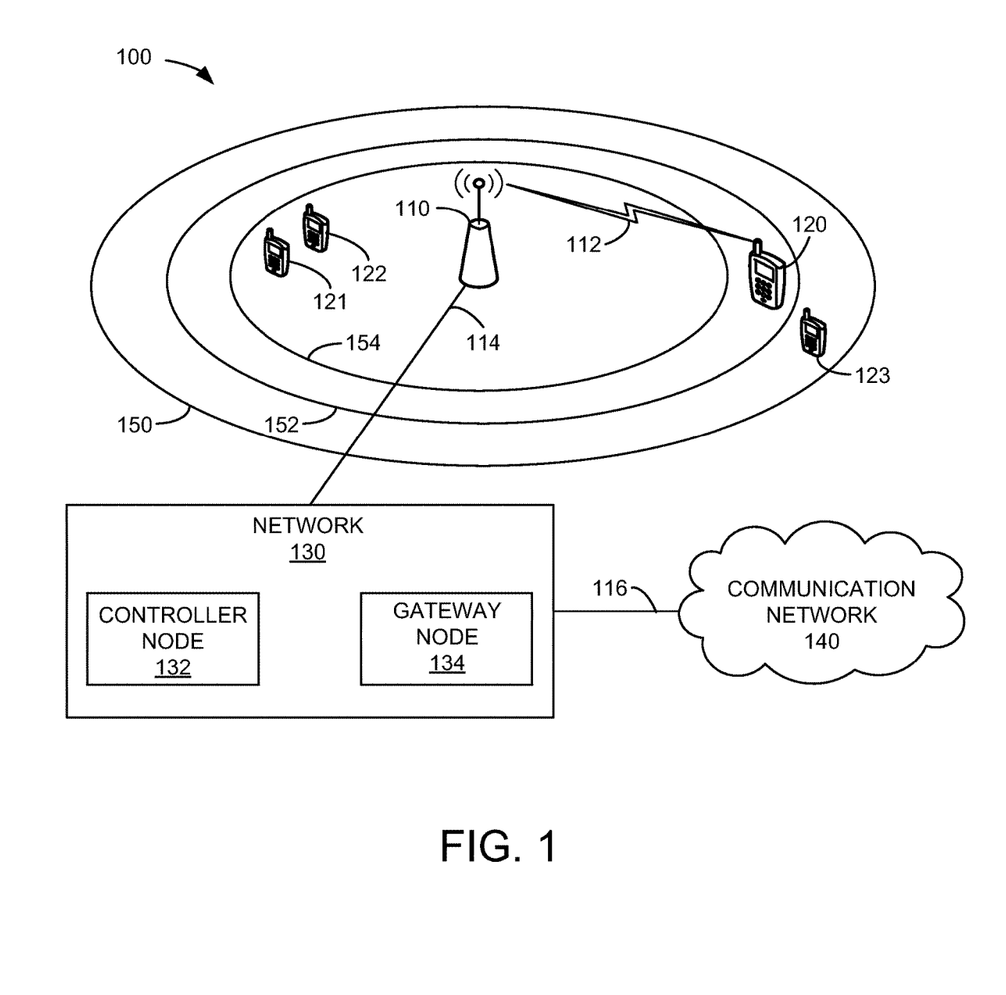
FIG. 1 schematically illustrates an exemplary communication system for transferring a wireless device from a serving cell to a target cell.

FIG. 1 illustrates an exemplary system 100 for transferring a wireless device from a serving cell to a target cell. According to an exemplary embodiment, system 100 comprises wireless devices 120-123, access node 110, and communication network 130. Other network elements may be present in the communication system 100 to facilitate communication but are omitted for clarity, such as controller nodes, base stations, base station controllers, gateways, mobile transferring centers, dispatch application processors, and location registers such as a home location register or visitor location register. Furthermore, other network elements may be present to facilitate communication between access node 110 and communication network 130 that are omitted for clarity, including additional processing nodes, routers, gateways, and physical and/or wireless data links for carrying data among the various network elements.

Each of wireless devices 120-123 can be any device configured to communicate over system 100 using a wireless communication link. For example, wireless devices 120-123 can include a cell phone, a smart phone, a computing platform such as a laptop, palmtop, or a tablet, a personal digital assistant, or an internet access device, and combinations thereof. It is noted that while four wireless devices are illustrated in the exemplary embodiment of FIG. 1, which can be in communication with access node 110, any number of wireless devices can be implemented according to the various exemplary embodiments disclosed herein.

Wireless devices 120-123 can transmit and/or receive information over system 100 using various communication services. These services can include various voice, data, and/or MBMS services and applications. Such services may include, for example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 110 can be any network node configured to provide communication between any of wireless devices 120-123 and communication network 130. Access node 110 can be a short range access node or a standard access node. According to an exemplary embodiment, a short range access node could include a microcell base station, a picocell base station, a femtocell base station, or the like and a standard access node could include a base transceiver station, a radio base station, an eNodeB device, or an enhanced eNodeB device, or the like. It is noted that while one access node 110 is illustrated in the exemplary embodiment of FIG. 1, any number of access nodes can be implemented within system 100.

Communication networks 130, 140 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment.

Communication networks 130, 140 can be capable of carrying data, for example, to support voice, push-to-talk, broadcast video, and data communications by a wireless device, such as any of wireless devices 120-123. Wireless network protocols can comprise, for example, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication networks 130, 140 comprise, for example, Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). According to an exemplary embodiment, communication networks 130, 140 can also comprise additional base stations, controller nodes, telephony switches, internet routers, network gateways, computer systems, communication links, or other types of communication equipment, and combinations thereof.

Communication link 112 are wireless links that use various communication protocols such as, for example, Internet, Internet protocol (IP), local-area network (LAN), optical networking, hybrid fiber coax (HFC), telephony, T1, or some other communication format, including combinations, improvements, or variations thereof. Although a communication link is depicted between only wireless device 120 and access node 110, any of wireless devices 120-123 may be linked to access node 110 via a communication link. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Link 112 can be a direct link or may include various equipment, intermediate components, systems, and networks, according to an exemplary embodiment.

System 100 may use a plurality of carriers to provide wireless communication services, according to an exemplary embodiment. A plurality of carriers that comprise bandwidth for wireless communications (e.g., 1.25 GHz carrier, 1.9 GHz carrier, and 800 MHz carrier, and the like) may include a plurality of channels (e.g., 5 MHz channels, 10 MHz channels, 15 MHz channels, and the like) that may be further divided into subcarriers. According to an exemplary embodiment, a frequency band may comprise a carrier, a channel, a subcarrier, a plurality of any of these, or any other suitable frequency band.

As depicted in the exemplary embodiment of FIG. 1, access node 110 may have a signal areas 150, 152 and 154. Signal area 150 may comprise an area around access node 110 where a wireless device may detect wireless signals transmitted from access node 110 at a signal level above a threshold. For example, signal area 150 may comprise a coverage area for access node 110, such that wireless devices (e.g., wireless devices 120-123) that fall within signal area 150 are provided wireless resources by access node 110.

Access node 110 may communicate with controller node 132 and the gateway node 134 over communication link 114. The access node 110 may also be in communication with the communication network 140 over communication link 116. When communication system 100 includes a plurality of access nodes (not shown in the exemplary embodiment of FIG. 1), the access nodes may communicate directly with each other over communication links (not shown in FIG. 1) linking the various access nodes to one another.

Controller node 132 can be any network node configured to manage services within system 100. Controller node 132 may provide other control and management functions for system 100. Controller node 132 can be a single device having various functions or a plurality of devices having differing functions, according to an exemplary embodiment. For example, controller node 132 can include at least one of a multi-cell/multicast coordination entity (MCE), a mobility management entity (MME), a radio network controller (RNC), a mobile transferring center (MSC), and combinations thereof.

According to an exemplary embodiment, controller node 132 can comprise a processor and associated circuitry to execute or direct the execution of computer-readable instructions to obtain information. Controller node 132 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 132 can receive instructions and other input at a user interface, according to an exemplary embodiment. Controller node 132 can comprise a processor and associated circuitry to execute or direct the execution of computer-readable instructions to obtain information.

Gateway node 134 is a network element that can comprise a processor and associated circuitry to execute or direct the execution of computer-readable instructions, according to an exemplary embodiment. Gateway node 134 may retrieve and execute software from storage. Storage may include, for example, a disk drive, flash drive, memory circuitry, or some other memory device, that can be local or remotely accessible. According to an exemplary embodiment, the software comprises computer programs, firmware, or some other form of machine-readable instructions, and may include an operating system, utilities, drivers, network interfaces, applications, or some other type of software, including combinations thereof. According to an exemplary embodiment, gateway node 134 can provide to access nodes of system 100 (e.g., access node 110) instructions related to channel selection for communications with wireless devices (e.g., wireless device 120). For example, gateway node 134 can comprise at least one of a serving gateway (SGW), a packet data network gateway (PDNGW), a cellular gateway (CGW), and combinations thereof.

Communication network 130 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment. Communication network 130 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network comprise, for example, Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 114 and 116 can be wired or wireless communication links, according to an exemplary embodiment. Wired communication links can be, for example, twisted pair cable, coaxial cable or fiber optic cable, or combinations thereof. Wireless communication links can be, for example, a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile transferring centers, dispatch application processors, and location registers such as a home location register or visitor location register. Furthermore, other network elements may be present to facilitate communication among access node 110, controller node 132, gateway node 134, and communication network 140 that are omitted for clarity, including, for example, additional processing nodes, routers, gateways, and physical and/or wireless data links for carrying data among the various network elements. In an embodiment, any of controller node 132, gateway node 134, and one or more modules of the access node(s) (e.g., access node 110) may perform all or parts of the methods of FIG. 4, as illustrated in the various exemplary embodiments described herein.

Once a wireless device has found a cell, the wireless device may select the cell for communication. For example, a wireless device may be capable of using different cells (e.g., different bands) to communicate with a network. Subsequent to selection of the cell, (i.e., the serving cell), the wireless device will search for other cells that could be used for communications (i.e., target cell). For example, the wireless device may search for another cell that provides better quality for communications than the serving cell being used by the wireless device. The wireless device may determine if another cell is a higher priority cell, for example, through the use of reference signals, such as by determining whether the power of a reference signal received from another cell meets or exceeds a threshold for transferring from the serving cell to the target cell.

Figure 2:
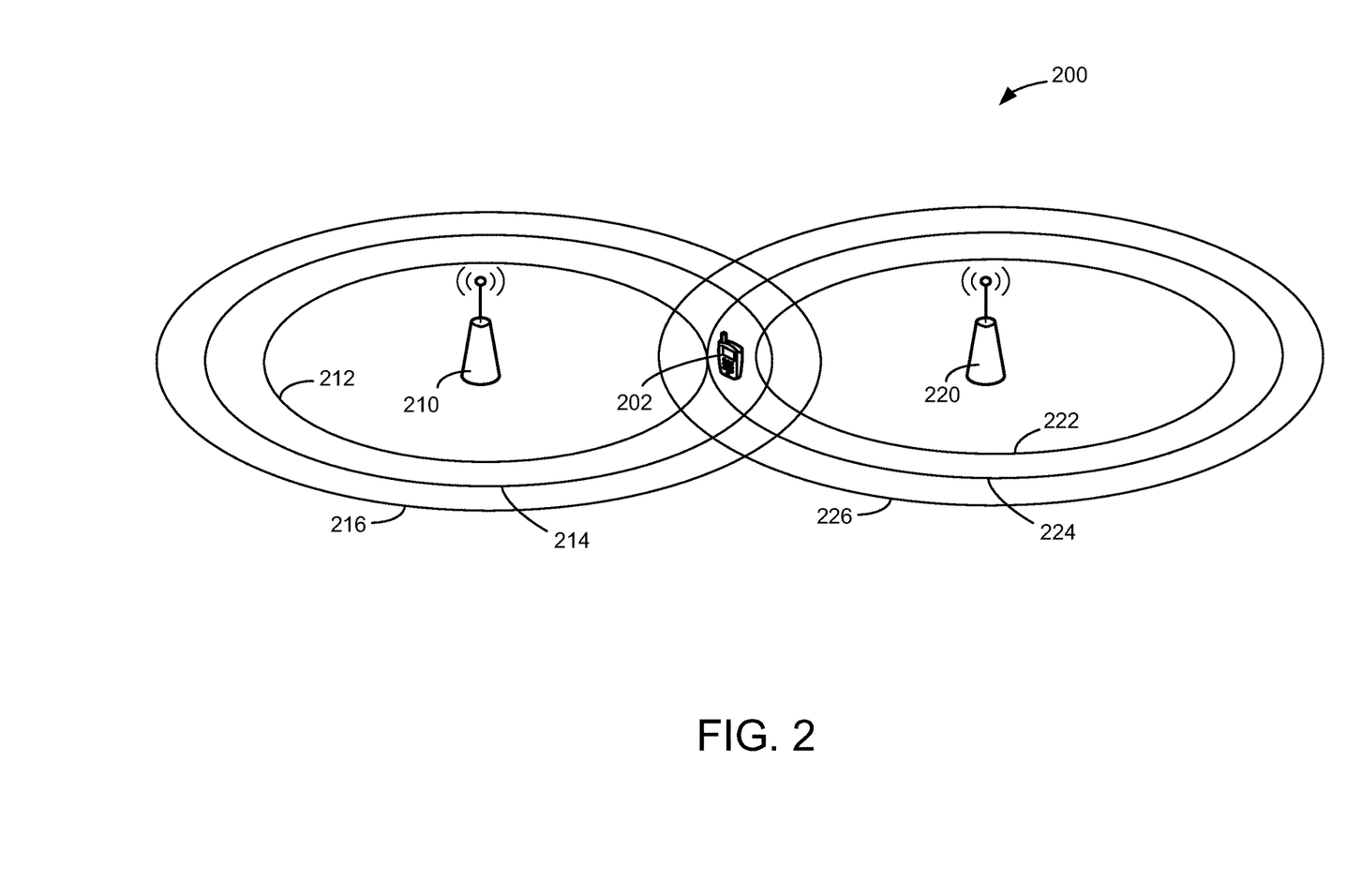
FIG. 2 illustrates another system for transferring a wireless device from a serving cell to a target cell.

Turning to FIG. 2, another system 200 for transferring a wireless device from a serving cell to a target cell is schematically depicted that includes a plurality of cells. System 200 includes a first access node 210 and second access node 220, which may be configured according to the access nodes of the various exemplary embodiments described herein (e.g., nodes 110) configured to communicate with one or more wireless devices 202 via one or more cells. For example, the first access node 210 may provide a plurality of cells 212, 214, 216, which are respectively represented by signal areas in the exemplary embodiment of FIG. 2. Similarly, the second access node 220 may provide a plurality of cells 222, 224, 226, which are respectively represented by signal areas in the exemplary embodiment of FIG. 2.

Although three cells 212-216, 222-226 for each of the access nodes 210, 220 are depicted in the exemplary embodiment of FIG. 2, other numbers of cells may be present, such as other numbers of cells provided by the access nodes 210, 220 and/or other access nodes in the region of wireless device 202. When wireless device 202 first selects a cell, wireless device 202 may select one of the cells 212-216, 222-226 and subsequently use a method to determine if another of the cells 212-216, 222-226 is a high priority cell. Thus, a wireless device (e.g., wireless device 202) may be transferred from a serving cell to another cell provided by the same access node (e.g., intra-cell transfer) or another cell provided by another access node (e.g., inter-cell transfer.

Cells may be categorized as a high priority cell or a low priority cell according to various parameters that may affect user experience. For instance, cells may differ in bandwidth, which may cause differences in user experience between wireless devices using different cells that vary in bandwidth. According to an exemplary embodiment, cells (e.g., cells 212-216, 222-226) can have bandwidths of, for example, 2.5 GHz, 1.9 GHz, 800 MHz, or other bandwidths familiar to those skilled in the art. A 1.9 GHz cell and a 800 MHz cell may be, for example, 5×5 MHz frequency division duplex (FDD) channels while a 2.5 GHz cell may be, for example, a 20 MHz time division duplex (TDD) channel. Therefore, a wireless device using the 1.9 GHz cell or the 800 MHz cell may experience a download speed of, for example, about 6 to about 8 Mbps, with peaks of about 25 Mbps. In contrast, a wireless device using the 2.5 GHz cell may experience a download speed of about 20 to about 25 Mbps, with peaks of about 60 Mbps or more. Thus, a 2.5 GHz cell may be ranked a high priority cell while a 1.9 GHz cell and a 800 MHz cell can be ranked as low priority cells.

The amount of time a wireless device uses a high priority cell instead of a low priority cell, or vice versa, can affect a user's experience of a wireless device. However, cells may also vary from one another in coverage. Low priority cells, for instance, may have greater coverage than high priority cells. For example, a 800 MHz cell may have coverage greater than a 1.9 GHz cell by, for example, about 12 dB, while the coverage of a 1.9 GHz cell may exceed the coverage of a 2.5 GHz cell by, for example, about 5 dB. Further, a difference in coverage between a 800 MHz cell and a 2.5 GHz cell may be, for example, about 15 to about 17 dB. These differences in coverage may result in a wireless device selecting low priority cells instead of the highest priority cells (e.g., selecting a 800 MHz cell or a 1.9 GHz cell instead of a 2.5 GHz cell) due to differences in coverage, even though high priority cells would provide the best experience, such as due to differences in bandwidth.

In view of these considerations regarding high priority and low priority cell, the transfer of a wireless device from a serving cell to a target cell may enhance the experience for using a wireless device. For example, methods and systems may favor selection of high priority cells for wireless device communications. The present disclosure contemplates such transfers, for example, when a wireless device is in idle mode or connected mode.

Methods that transfer the wireless device may be based on the power of reference signals, such as the power of reference signals that transmits between a wireless device and the serving cell and between the wireless device and a target cell. For example, a wireless device may switch from a low priority cell to a high priority cell (e.g., transferring from a 1.9 GHz cell or a 800 MHz cell to a 2.5 GHz cell, or from a 800 MHz cell to a 1.9 GHz cell). According to an exemplary embodiment, when determining whether to switch from a low priority cell to a high priority cell, a wireless device determines whether a power of received reference signals from a target cell (to be switched to) is greater than a product of (1) a threshold that the reference signal power from the target cell must exceed for transferring from low to high priority cell (which may be referred to as, for example, ThreshXHigh) and (2) a threshold for a minimum received reference signal power (which may be referred to as, for example, qRxLevMin) to initiate a transfer to the target cell.

In another example, a wireless device may switch from a high priority cell to a low priority cell (e.g., transferring from a 2.5 GHz cell to a 1.9 GHz cell or a 800 MHz cell, or from a 1.9 GHz cell to a 800 MHz cell). According to an exemplary embodiment, when determining whether to switch from a high priority cell to a low priority cell, a wireless device initially determines whether a power of received reference signals from a serving cell selected by the wireless device is less than a product of (1) a threshold for the power of the received reference signals (which may be referred to as, for example, sNonIntraSearch) when selecting a target cell of equal or lower priority, and (2) a threshold for a minimum received reference signal power (e.g., qRxLevMin) to initiate a transfer to a target cell. If this initial determination is true (the power of the received reference signals from the serving cell is less than the product), transfer to the lower priority cell occurs when both (A) the power of reference signals received from a serving cell is less than a product of (1) a product of a threshold (which may be referred to as, for example, ThreshServingLow) that the power of reference signals from the serving cell must fall below for transferring from high to low priority cell, and (2) the threshold for a minimum received reference signal power (e.g., qRxLevMin) to initiate a transfer; and (B) the power of reference signals received from a target cell is greater than a product of (1) a product of a threshold (which may be referred to as, for example, ThreshXLow) that reference signal power from target cell must exceed for transferring from high to low priority cell, and (2) the threshold for a minimum received reference signal power (e.g., qRxLevMin) to initiate a transfer to a target cell.

The exemplary wireless device transfer methods described above use fixed thresholds for determining when the transfer of the wireless device from the serving cell to the target cell should occur. As a result, the methods do not account for one or more factors that can reflect the priority of the serving and target cells.

Figure 3:
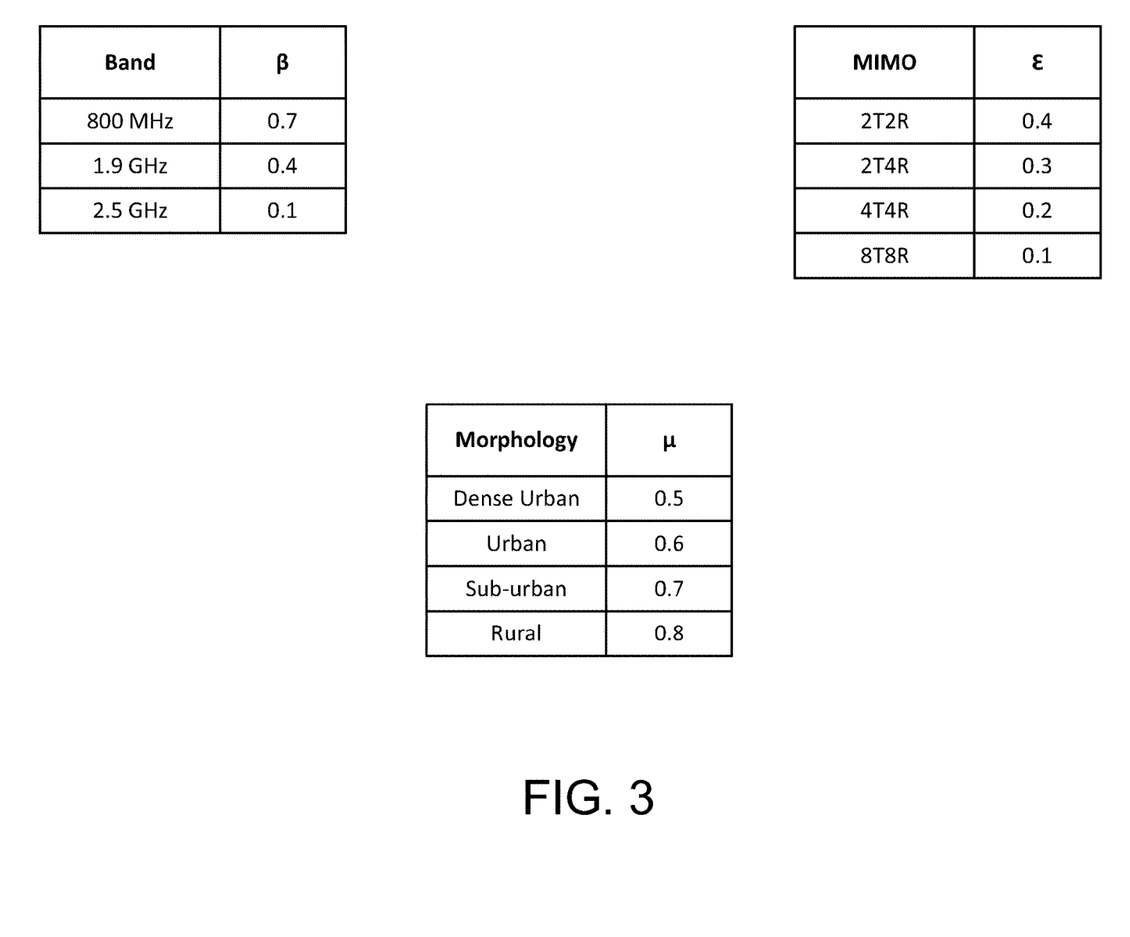
FIG. 3 depicts exemplary factors that may be used to transfer a wireless device from a serving cell to a target cell.

FIG. 3 depicts exemplary factors that may be used to transfer a wireless device from a serving cell to a target cell. Such factors include, for example, morphology (e.g., whether an area of a network is urban or rural), what type of cell is currently being used (e.g., low priority or high priority), cell loading, and the multiple input multiple output (MIMO) type of an access node.

According to an exemplary embodiment, morphology can be represented by the symbol $\mu$ and can range from 0 to 1. For example, morphology ($\mu$) can have values of: about 0.5 for dense urban morphology, about 0.6 for an urban morphology, about 0.7 suburban morphology, or about 0.8 for a rural morphology. As urban density increases, value for morphology approaches 0, according to an exemplary embodiment. Morphology of an area could be determined, for example, by looking at the number and type of cells, with a large number of microcells, for instance, indicating a dense urban morphology.

Cell type can be represented by the symbol $\beta$ and can range from 0 to 1. For example, cell type ($\beta$) can have values of: about 0.7 for a 800 MHz cell, about 0.4 for a 1.9 GHz cell, or about 0.1 for a 2.5 GHz cell. Cell type can be dynamically adjusted, such by making the value for cell type smaller for a high priority band, such as to favor selection of a high priority cell, according to an exemplary embodiment.

Cell loading (not shown) can be represented by the symbol $\emptyset$ and can be dynamically adjusted in view of loading for a serving cell used by a wireless device to enable a transfer of a wireless device to a target cell, according to an exemplary embodiment.

MIMO type can be represented by the symbol $\epsilon$ and can vary from 0 to 1, according to an exemplary embodiment. MIMO type ($\epsilon$) can have values of, for example: about 0.4 for 2T2R (two transmit, two receive MIMO), about 0.3 for 2T4R, about 0.2 for 4T4R, or about 0.1 for 8T8R. MIMO may vary according to MIMO type, with higher level MIMO types having lower c value, according to an exemplary embodiment.

The present disclosure contemplates methods and systems for transferring a wireless device from a serving cell to a target cell on factors that reflect a priority of the serving cell and the target cell. The factors can affect the transfer of the wireless device such that the wireless device is more likely to transfer from a low priority cell to a high priority cell and less likely to transfer from a high priority cell to a low priority cell, as is illustrated in the following method.

Figure 4:
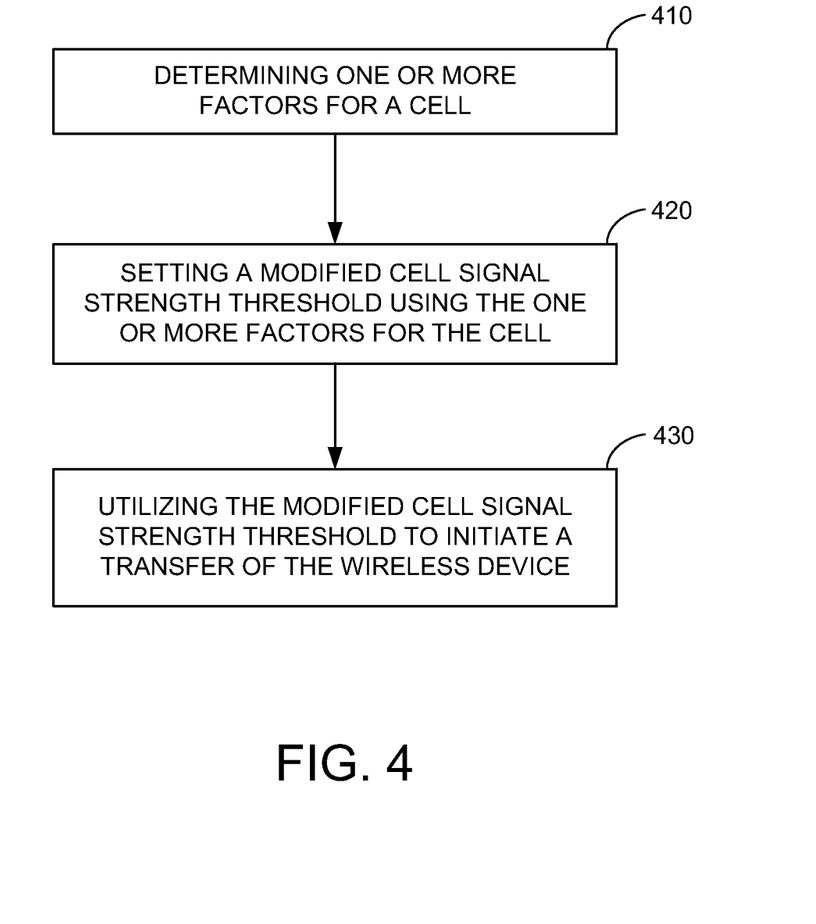
FIG. 4 illustrates a method for transferring a wireless device.

FIG. 4 illustrates a method for transferring a wireless device, according to an exemplary embodiment. In step 410, the systems and methods described herein determine one or more the factors to be used in a wireless device transfer procedure. According to an exemplary embodiment, step 410 includes determining values for the factors, such as by, for example, analyzing network data and/or access node data to determine values for the various factors. For example, network data and/or access data may be analyzed to determine values for one or more of morphology, cell type, cell loading, and MIMO type. In step 420, the methods set a modified cell signal strength threshold using the one or more factors for the cell, such as reference signals received by a wireless device from a serving cell and/or a target cell. In step 430, the methods described herein utilize the modified cell strength threshold to initiate a transfer of the wireless device from the serving cell to the target cell.

The present disclosure contemplates various methods that use factors to transfer a wireless device from a serving cell to a target cell. According to an exemplary embodiment, the methods described herein may use the following equations (which are represented in decimal format but, alternatively, could be in logarithmic format) that use factors (e.g., morphology ($\mu$), cell type ($\beta$), cell loading ($\emptyset$), and MIMO type ($\epsilon$)) to determine whether the wireless device should be transferred from a low priority cell to a high priority cell.

When transferring from low priority cell to a high priority cell (e.g., from a 1.9 GHz cell or a 800 MHz cell to a 2.5 GHz cell, or from a 800 MHz cell to a 1.9 GHz cell):

$$\text{Target } RSRP > \left\{ ThreshXHigh * \frac{qRxLevMin * \mu}{(\phi S - \phi T)} * \beta * \varepsilon \right\} \quad (1)$$

With "Target RSRP" being a power of reference signals received from a target cell (to be switched to), ThreshXHigh being a threshold that the reference signal power from the target cell must exceed for transferring from low to high priority cell, and qRxLevMin being a threshold for a minimum received reference signal power for a wireless device transfer.

When transferring from a high priority cell to a low priority cell (e.g., from a 2.5 GHz cell to a 1.9 GHz cell or a 800 MHz cell, or from a 1.9 GHz cell to a 800 MHz cell), an evaluation of a serving cell includes:

$$\text{Serving } RSRP < \left\{ sNonIntraSearch * \frac{qRxLevMin}{\mu * \beta * \varepsilon} \right\} \quad (2)$$

With Serving RSRP being a power of reference signals received from a serving cell, sNonIntraSearch being a threshold for the power of the received reference signals when selecting a target cell of equal or lower priority, and qRxLevMin being a threshold for a minimum received reference signal power for a wireless device transfer. As indicated in equation (2) above, evaluation of a serving cell need not consider cell loading (e.g., cell loading Ø). When the power of reference signals received from a serving cell is lower than the product of equation (2), the following equations (3) and (4) may be used to determine if the wireless device should be transferred:

$$\text{Serving } RSRP < \left\{ ThreshServingLow * \frac{qRxLevMin * (\phi S - \phi T) * \beta}{\mu * \varepsilon} \right\} \quad (3)$$

$$\text{Target } RSRP > \left\{ ThreshXLow + \frac{qRxLevMin * \mu}{(\phi S - \phi T)} * \beta * \varepsilon \right\} \quad (4)$$

Here, Serving RSRP is a power of reference signals received from a serving cell, Target RSRP is a power of reference signals received from a target cell, ThreshServingLow is a threshold that the power of reference signals received from the serving cell must fall below for transferring from high to low priority cell, ThreshXLow is a threshold that the power of reference signals from a target cell must exceed for transferring from high to low priority cell, $Ø_S$ is cell load for a serving cell, $Ø_T$ is cell loading for a target cell, and qRxLevMin is a threshold for a minimum received reference signal power for a wireless device transfer. According to an exemplary embodiment, if $(Ø_S-Ø_T)<0$, then $(Ø_S-Ø_T)=1$.

As shown in the above equations (1)-(4), the variable factors may be used to change the threshold (e.g., qRxLevMin) for a minimum power for reference signals received by a wireless device in order to initiate a wireless device transfer. Thus, the threshold may be varied due to the dynamic changing of values of the variable factors. For example, the threshold may be varied to favor use of high priority cells, such as by increasing the threshold when a cell is determining whether to switch from a high priority cell to a target cell having a lower priority. In another example, the threshold may be varied to favor use of high priority cells by lowering the threshold when the cell is considering whether to switch from a low priority cell to a high priority cell. According to an exemplary embodiment, the threshold may have a value measured in negative dBm (-dBm), with a value closer to zero being higher than a value further from zero.

Figure 5:
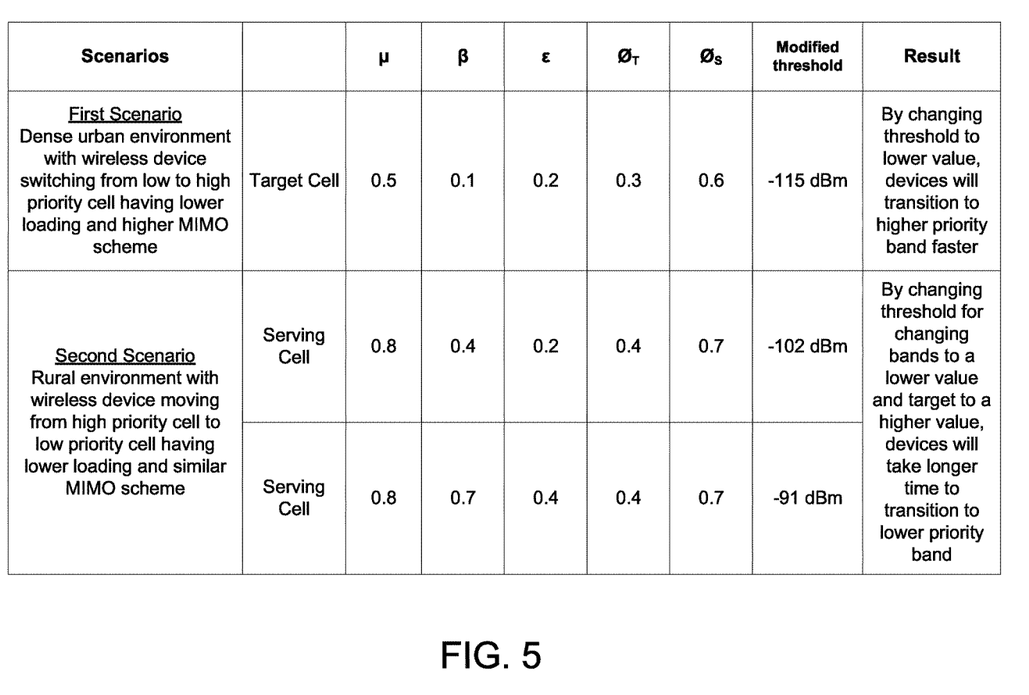
FIG. 5 illustrates an exemplary use of resources for a method of efficient cell selection.

FIG. 5 depicts an exemplary embodiment in which particular values have been selected for exemplary factors (e.g., morphology (μ), cell type (β), cell loading (Ø, with $Ø_S$ being cell load for a serving cell and $Ø_T$ being cell loading for a target cell), and MIMO type (ε)) to demonstrate how the exemplary embodiments described herein may be used in systems and methods for a wireless device transfer. In the exemplary embodiment of FIG. 5, a standard threshold (e.g., a threshold not varied according to factors, as discussed herein) for a minimum received reference signal power to initiate a wireless device transfer (e.g., qRxLevMin) is -100 dBm or 1 $e^{-10}$ mW. In other words, the methods of the various exemplary embodiments described herein may be used to vary the threshold, such as from a value of -100 dBm in order to favor selection of a high priority cell and enhance a user's experience of a wireless device.

As shown in the first scenario (first row) of FIG. 5, which regards a dense urban environment in which a cell switches from a low priority cell (e.g., a 1.9 GHz cell) to a high priority cell (e.g., a 2.5 GHz cell) having lower cell loading and a higher MIMO scheme, the threshold for a minimum power for reference signals received by a wireless device in order to initiate a wireless device transfer (e.g., qRxLevMin) is lowered, which facilitates a switch from the low priority cell to a high priority cell. As shown in the second scenario (second row) of FIG. 5, which regards a rural environment in which a cell determines whether to switch from a high priority cell (e.g., a 1.9 GHz cell) to a low priority cell (e.g., a 800 MHz cell) having lower cell loading and a similar MIMO scheme, the threshold for a minimum power for reference signals received by a wireless device in order to initiate a wireless device transfer (e.g., qRxLevMin) is increased (e.g., is closer to zero), which makes transferring from the high priority cell to the low priority cell less likely.

Although the methods of the various exemplary embodiments described herein may perform steps in a particular order for purposes of illustration, the methods of the various exemplary embodiments discussed herein are not limited to any particular order or arrangement. One skilled in the art, using the disclosure provided herein, will appreciate that various steps of the methods can be omitted, rearranged, combined, and/or adapted in various ways.

Figure 6:
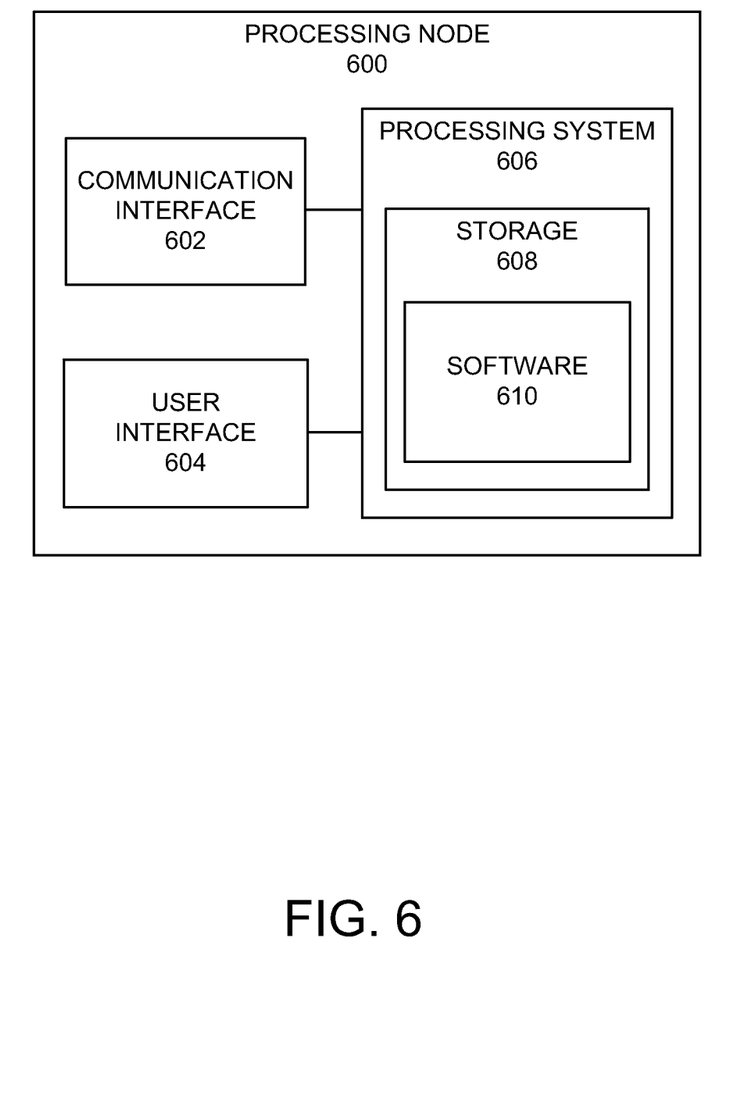
FIG. 6 illustrates a processing node for a communication system.

The exemplary embodiment of FIG. 6 illustrates a processing node 600 of a communication system. Processing node 600 comprises communication interface 602, user interface 604, and processing system 606 in communication with communication interface 602 and user interface 604. Processing node 600 can be configured to determine, for example, a communication access node for a wireless device. According to an exemplary embodiment, processing system 606 includes storage 608, which can comprise a disk drive, flash drive, memory circuitry, or other memory device. Storage 608 can store software 610 used in the operation of the processing node 600, according to an exemplary embodiment. Storage 608 may include, for example, a disk drive, flash drive, data storage circuitry, or some other memory apparatus. Software 610 may include, for example, computer programs, firmware, or some other form of machine-readable instructions, including an operating system, utilities, drivers, network interfaces, applications, or some other type of software.

Processing system 606 may include, for example, a microprocessor and other circuitry to retrieve and execute software 610 from storage 608. Processing node 600 may further include other components such as, for example, a power management unit, a control interface unit, etc., which are omitted for clarity. According to an exemplary embodiment, communication interface 602 permits processing node 600 to communicate with other network elements. According to an exemplary embodiment, user interface 604 facilitates the configuration and control of the operation of processing node 600.

Examples of processing node 600 include, for example, controller node 132 and gateway node 134 of the exemplary embodiment of FIG. 2. According to an exemplary embodiment, processing node 600 can be an adjunct or component of a network element, such as an element of access nodes 110, 210, 220, and the like. Processing node 600 can also be another network element in a communication system, according to an exemplary embodiment. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for transferring a wireless device from a serving cell to a target cell, the method comprising:
    setting a transfer threshold for target cell signal strength;
    determining one or more factors for the target cell, the one or more factors being at least one of a morphology, a band class, and a MIMO type;
    modifying the transfer threshold for the target cell using the one or more factors for the target cell; and
    initiating a transfer of the wireless device from the serving cell to the target cell based on the modified transfer threshold for the target cell.

2. The method of claim 1, wherein utilizing the modified transfer threshold comprises comparing the modified transfer threshold to a signal strength of a reference signal that is provided by the target cell.

3. The method of claim 1, wherein utilizing the modified transfer threshold comprises providing the modified transfer threshold to the wireless device.

4. The method of claim 1, wherein setting the modified transfer threshold is performed by a network element.

5. The method of claim 4, wherein the network element is comprised of at least one of the serving cell and the target cell.

6. The method of claim 4, wherein the modified transfer threshold is a constant set in the wireless device by an operator of the network element.

7. The method of claim 1, wherein the transfer of the wireless device from the serving cell to the target cell comprises a cell reselection.

8. The method of claim 1, wherein the transfer of the wireless device from the serving cell to the target cell comprises a handover.

9. A method for transferring a wireless device from a serving cell to a target cell, the method comprising:
    setting a transfer threshold for serving cell signal strength;
    determining factors for the serving cell, the factors being at least two of a morphology, a band class, and a MIMO type;
    modifying the transfer threshold for the serving cell using the factors; and
    utilizing the modified transfer threshold to determine if the target cell is to be measured.

10. The method of claim 9, wherein utilizing the modified transfer threshold to determine if the target cell is to be measured comprises comparing the modified transfer threshold to a signal strength of a reference signal provided by the serving cell.

11. The method of claim 9, wherein utilizing the modified transfer threshold to determine if the target cell is to be measured comprises providing the modified transfer threshold to the wireless device.

12. The method of claim 9, wherein setting a modified transfer threshold for the serving cell with the factors does not include setting the modified transfer threshold with a loading of the serving cell.

13. The method of claim 9, wherein setting the transfer threshold for the serving cell with the factors comprises setting the modified transfer threshold with the morphology, band class, and MIMO type.

14. A method for transferring a wireless device from a serving cell to a target cell, the method comprising:
    setting a transfer threshold for serving cell signal strength;
    determining one or more factors for the serving cell, the one or more factors being at least one of a morphology, a band class, and a MIMO type;
    modifying the transfer threshold for the serving cell using the one or more factors; and
    utilizing the modified transfer threshold to initiate a transfer of the wireless device from the serving cell to the target cell.

15. The method of claim 14, further comprising:
    setting a target cell transfer threshold for target cell signal strength;
    modifying the target cell transfer threshold using the one or more factors for the serving cell; and
    utilizing the modified target cell transfer threshold to initiate a transfer of the wireless device from the serving cell to the target cell.

16. The method of claim 14, wherein utilizing the modified transfer threshold comprises comparing the modified transfer threshold to a signal strength of a reference signal provided by the serving cell.

17. The method of claim 14, wherein utilizing the modified transfer threshold comprises providing the modified transfer threshold to the wireless device.

18. The method of claim 14, wherein setting the transfer threshold is performed by a network element.

19. The method of claim 18, wherein the network element is comprised of at least one of the serving cell and the target cell.

20. The method of claim 18, wherein the modified transfer threshold is a constant set in the wireless device by an operator of the network element.

21. The method of claim 14, wherein the one or more factors include morphology and at least one of a band class, a loading, and a MIMO type.

\* \* \* \* \*